United States Patent

[11] 3,561,420

[72] Inventor Philip Paolella
 Hamden, Conn.
[21] Appl. No. 793,076
[22] Filed Jan. 22, 1969
[45] Patented Feb. 9, 1971
[73] Assignee Plasticrete Corporation
 Hamden, Conn.
 a corporation of Connecticut

[54] OUTDOOR GRILL
 7 Claims, 8 Drawing Figs.

[52] U.S. Cl. .................................................. 126/8,
 126/9, 126/25
[51] Int. Cl. ........................................................ A47j 37/00,
 F24b 3/00; F24c 15/08
[50] Field of Search ........................................... 126/8, 9,
 25, 30

[56] References Cited
 UNITED STATES PATENTS

| | | | |
|---|---|---|---|
| 2,435,323 | 2/1948 | Pospisil .................. | 126/25 |
| 2,499,156 | 2/1950 | Paolella .................. | 126/9 |
| 2,728,334 | 12/1955 | Paolella .................. | 126/9X |
| 3,327,699 | 6/1967 | Uden ....................... | 126/25 |

FOREIGN PATENTS

| | | | |
|---|---|---|---|
| 367,302 | 3/1963 | Switzerland ............. | 126/8 |

*Primary Examiner*—Charles J. Myhre
*Attorney*—Delio and Montgomery

ABSTRACT: An outdoor grill constructed from blocks, and having a plurality of legs, a flat base section erected thereon, and a flue section with at least one metal perforated member supported on projections on the blocks of the flue section and elongated blocks positioned on the legs and the flat base section.

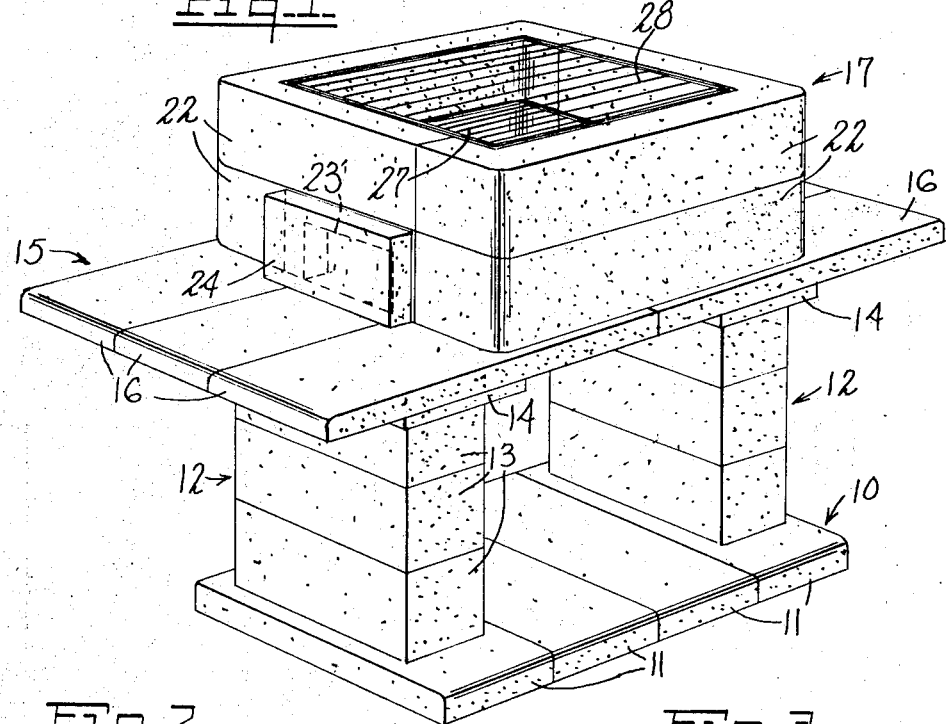
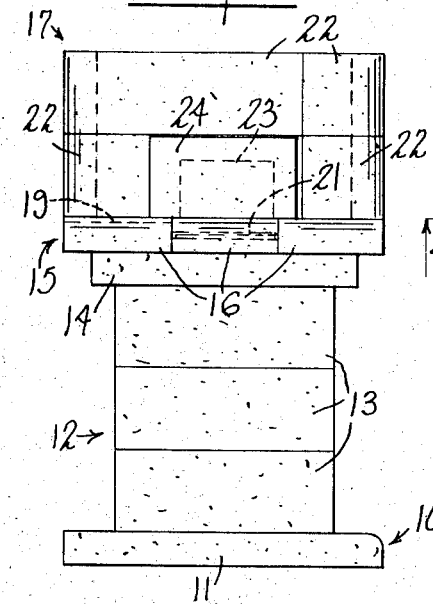
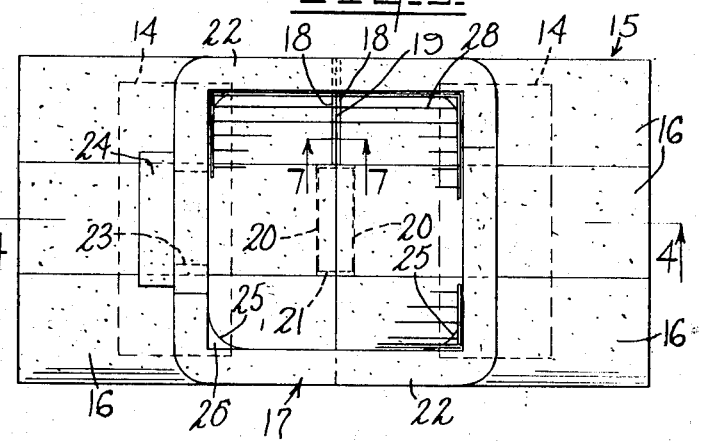
INVENTOR
Philip Paolella
BY Dedio and Montgomery
ATTORNEYS

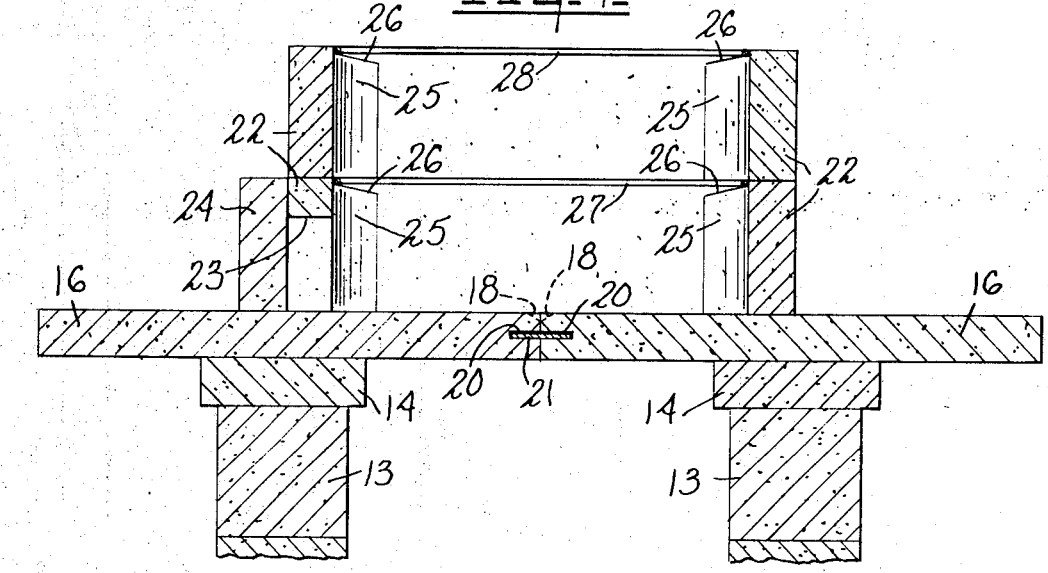
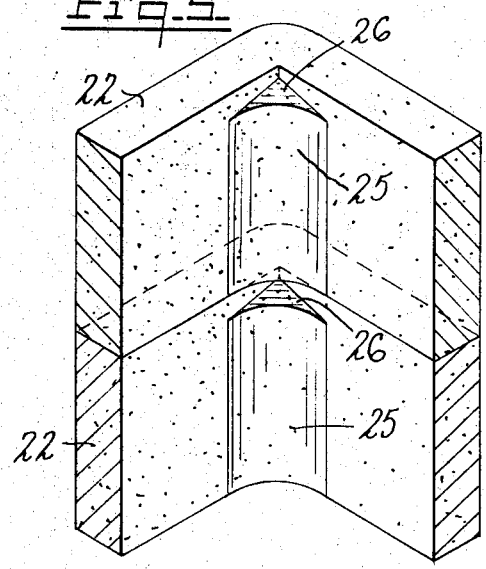
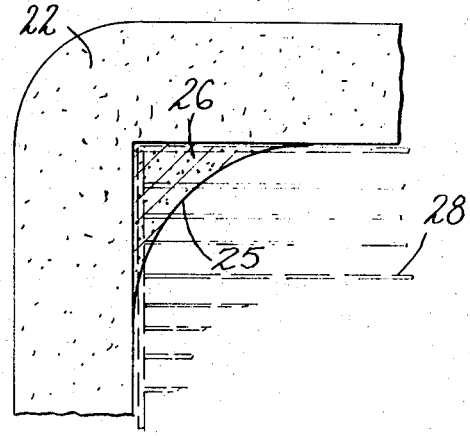
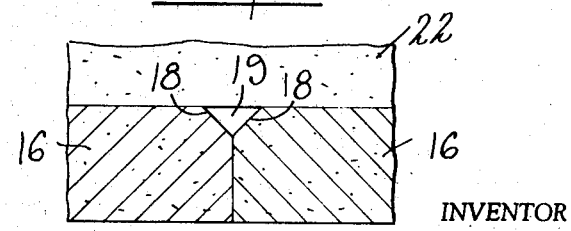
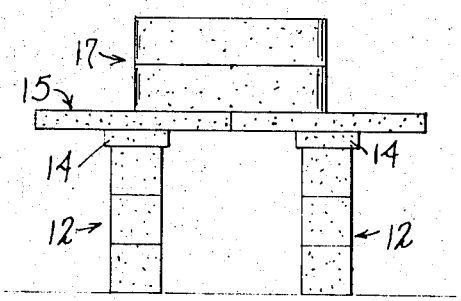
INVENTOR
Philip Paolella
BY De Lio and Montgomery
ATTORNEYS

OUTDOOR GRILL

The present invention relates to outdoor grills and more particularly to an outdoor grill which can be constructed without the use of mortar or cement Most outdoor grills of the prior art are constructed from blocks and mortar or cement. Such grills have the disadvantage that they cannot easily be moved from one place to another one once they are constructed. If it is desired to remove the grill entirely from the yard where it is constructed, the grill is usually destroyed since it is too expensive and difficult to transport as a whole to a new location. Moreover, such grills are time-consuming and costly to set up, usually requiring the services of skilled labor.

Accordingly, it is quite advantageous to have an outdoor grill which can be constructed of concrete blocks simply by placing the blocks together. Such a block outdoor grill can be set up by the average houseowner without the services of skilled labor. Further, such a grill can be easily moved from place to place in the yard by dismantling it and setting it up in the new location. Additionally, such a grill can be dismantled and transported any desired distance.

Such block outdoor grills are disclosed in U.S. Pat. No. 2,728,334 and 2,499,156. The more advanced and versatile grill is shown in U.S. Pat. No. 2,728,334. This grill is constructed from blocks without the use of mortar or cement. Positioned on top of block legs there are two metal rods. These rods support both the coal screen and the shelf. It can be noted that the upper food screen is placed on top of the highest block layer without any means for locking it in place. There are a number of disadvantages in using metal bars to support the lower screen and the shelf. The metal bars will usually melt somewhat under heat and join onto the screen. Further, as a result of the formation of rust, the screen and rods will also be joined. Thus, after the grill has been in use for a time it becomes difficult to remove the coal screen for cleaning. As a result, the upper block layer and the shelf must be removed in order to clean the screen. In addition, the use of a specially contoured and reenforced concrete shelf in this outdoor grill raises its cost considerably. As pointed out in this patent, the use of this specially reenforced shelf is necessary because it is supported by two metal bars.

Another disadvantage of this grill is that the upper screen has no means for locking it in place. Thus, it can be accidentally jarred from its position and the food on it will fall into the fire or on the ground.

In view of the foregoing, it is an object of this invention to provide a new, improved and less expensive outdoor block grill.

Another object of this invention is to provide a new and improved outdoor block grill providing better support for the metal screens of the grill.

A further object of the invention is to provide a new and improved outdoor block grill which is simple to manufacture and construct.

Still other objects and advantages of the invention will in part be obvious and will in part appear hereinafter.

In accordance with the present invention, the outdoor grill is constructed from concrete blocks without the use of mortar or cement. Two legs are formed from a plurality of blocks, which legs are of equal height. A plurality of elongated blocks is used to form a flat base section on top of the legs, such that each pair of blocks has its adjacent ends abutting one another. Usually six such blocks are used to form a rectangular base section having a length of two blocks and a width of three blocks. The middle pair of blocks has complementary recesses in their adjacent ends for positioning a metal plate therein. The metal plate prevents the adjacent ends of the blocks from parting when pressure is applied to the external ends of the blocks. A flue section is then formed on the flat base section from a plurality of block sections, such that the block sections form annular layers of blocks, one on top of another. The lowest annular layer of blocks has an opening therein to provide a draft, which opening may be covered by a block. The cross section of the inside surfaces of said annular layers of blocks is in the form of a rectangular, wherein the corners of the rectangle are partially filled in or rounded in each layer of blocks so as to form projections. Thus, a rectangular metal screen can be supported at the top of each layer of annular blocks. In the case where there are two annular layers of blocks, the screen which supports the coal is supported at the upper end of the lower annular layer of blocks. The screen on which the food is to be placed is positioned at the upper end of the upper layer of annular blocks.

The invention accordingly comprises an article of manufacture possessing the features, properties and relation of elements which will be exemplified in the article hereinafter described and the scope of the invention will be indicated in the claims.

For a fuller understanding of the a nature and objects of the invention, reference is had to the following description, taken in conjunction with the accompanying drawings in which:

FIG. 1 is an isometric view of the complete outdoor grill of this invention;

FIG. 2 is a side view of the grill of this invention;

FIG. 3 is a top view of the grill of this invention;

FIG. 4 is a cross-sectional view taken along line 4—4 of FIG. 3;

FIG. 5 is an isometric view of a corner of the flue section of the grill;

FIG. 6 is a top view of a corner of the flue section of the grill;

FIG. 7 is a cross-sectional view taken along line 7—7 of FIG. 3; and

FIG. 8 is a side view of an alternate embodiment of this invention.

Referring generally to FIGS. 1—7, it is seen that the outdoor grill of this invention has a floor section shown at 10 which is constructed of four flat elongated blocks 11.

With respect to the blocks used in the construction of the grill of this invention, it is noted that such blocks are preferably of concrete because of its strength and durability. However, blocks of the other suitable materials may be used.

On top of the floor section 10 there are two legs 12 constructed from six rectangular blocks 13, said legs being of the same height. In this respect, it should be noted that more or less legs can be constructed. However, one leg would not provide sufficient support and more than two legs are not necessary. Also, blocks or different sizes may be used to construct the legs. The blocks, as disclosed in the drawings, are 6"by 6"by 16". It is only necessary that the legs have a sufficient height so that the top of the grill is at the required level and that the tops of the legs are at the same height.

On top of each leg there is placed an elongated flat block 14, similar 24 to blocks 11, for supporting a flat base section 15. It is noted that the support blocks 14 are not needed unless blocks 13 have a small length, such that blocks 13 cannot support the blocks of the flat base section 15. Positioned above blocks 14 is a flat base section 15 constructed of six elongated blocks 16, similar to blocks 11. In this respect, it is noted that blocks 11, 14 and 16 may all have the same dimensions, that is 2⅝ inches by 8 inches by 24 inches. The advantage of this is that the outdoor grill of this invention can be manufactured very inexpensively. However, it is to be understood that these blocks do not necessarily have to be of the same dimensions, it only being necessary that the blocks have the proper dimensions to support the block section resting on them. It is further noted that the flat base section 15 need not necessarily be constructed of six blocks. It may be constructed from more or less blocks of different dimensions than those shown, insolong as they can be properly supported on blocks 14 and insolong as they can form a base section which will provide sufficient support for the flue section 17.

The pairs of blocks 16 at the front or back end of the flat base section have cuts 18 along their adjacent ends so as to form a channel 19, as clearly shown in FIG. 7. This channel allows the drainage of rainwater or other fluids which may accumulate on the surface of the base section 15 inside the flue section 17.

The weight of the flue section on top of the base section is normally sufficient to counterbalance the weight of articles which may be placed on the ends of base section 15. However, to provide additional support, the adjacent ends of the central pair of blocks have complementary recesses 20 therein extending along the width of the blocks, into which recesses 20 a metal plate 21 is positioned. Although the adjacent ends of all the pairs of blocks may thus be supported, it has been found that only the central pair of blocks need be so supported in order to impart sufficient strength to the base section 15 for most purposes.

The flue section 17 is formed from annular layers of block sections 22. As can be seen, the blocks have cross sections in the form of half a rectangle. When two such blocks are placed together they form one annular layer of the flue section whose cross section is in the form of a rectangle. The annular layer so formed has a height of 6 inches and a thickness of 2⅝ inches. Each external side of the rectangle is 24 inches long. It is to be understood, however, that this invention is not limited to these dimensions.

In accordance with the preferred embodiment of the invention, the flue section is formed from two annular layers of block sections. In this respect, there need not be only two annular layers of blocks forming the flue section. There can be one annular layer of blocks or more than two layers. In accordance with the preferred embodiment, one block section in the lower annular layer has an opening 23 therein for providing draft to the fire in the grill. This opening may be closed with blocks 24, when required.

The inside corners of block section 22 are filled or rounded, with with the exception of the uppermost part of the corners to form projections 25. The uppermost part 26 of the projection is slanted so as to prevent the accumulation of dirt or other matter thereon.

Metal screens or other suitable rectangular metal members are supported on parts 26 of the projections. Metal screen 27, for supporting the coal or other fire materials, is positioned on top of the projections in the lower annular layer of blocks. Metal screen 28, which supports the food, is positioned on top of the projections in the upper annular layer of blocks.

Although the preferred embodiment is shown with two screens, it should be understood that the coal or other fire materials can be placed on top of base section 15. In such case, only a single screen is necessary, positioned on top of a single annular layer of blocks which would form the flue section. However, the embodiment illustrated permits better burning of the coal and the resultant cooking of the food.

The rectangular block sections 22 shown for forming the flue section are preferred since they are simple to construct and require very little effort to assemble to form the flue section 17. In accordance with this invention, however, circular block sections and block sections having cross sections other than that of block sections 22, may be used to form a flue section having a cross section different from that illustrated in the preferred embodiment. These other block sections would necessarily have to have projections on their inside surface to support the metal screens.

FIG. 7 illustrates an alternate embodiment of the invention wherein a floor section, such as floor section 10 of FIGS. 1—7, is not used. Accordingly, in the case where the grill is assembled on a flat, relatively smooth surface, a floor section need not be utilized.

As can be noted from the description the preferred embodiment, the present invention has many advantages. Many of the blocks for the different sections of the grill are the same, so that the total expenditure for the manufacture of the grill is considerably less than that for comparable grills of the prior art. In particular, an inexpensive shelf or base section is used, in comparison to the expensive shelves used in the prior art grills. Additionally, this invention eliminates the necessity for iron bars to support the metal screens and shelf with the attendant disadvantages resulting from the use of such iron bars.

It will thus be seen that the objects set forth above, among those made apparent from the preceeding description, are efficiently attained and since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

I claim:
1. An outdoor grill which is constructed from blocks without the use of mortar or cement, comprising:
   a. a plurality of legs constructed from blocks laid one on top of another;
   b. a flat base section to which is erected from a plurality of elongated blocks and rests upon said legs;
   c. a flue section formed from a plurality of block sections which, when placed go together on said flat base section, form at least one annular layer of blocks, wherein said block sections have projections on their inside surfaces;
   d. at least one metal perforated member which is supported on said projections such that the perforated member lies inside the flue section created by said block sections and can support food to be cooked thereon;
   e. elongated blocks positioned between the legs and the flat base section such that said flat base section can be better supported by said legs.

2. The outdoor grill of claim 1, wherein said flat base section has a channel in its top surface for the passage of liquid from said flat a base section which is surrounded by the flue section.

3. The outdoor grill of claim 1, wherein six elongated blocks are arranged such that each pair of blocks is laid end-to-end to form a rectangular flat base section a having a width of three blocks and a length of two blocks, wherein the middle pair of blocks has complementary recesses in their adjacent ends, and wherein a flat metal plate is positioned in said recesses.

4. The outdoor grill of claim 1, wherein the flue section is formed from two annular layers of blocks, and wherein the lowest annular layer of blocks has an opening therein for providing draft.

5. The outdoor grill of claim 4, further including a block for closing the opening in the lowest annular layer of blocks forming a flue section.

6. The outdoor grill of claim 4, wherein the block sections forming the flue sections are shaped such that the internal sides of the flue form a rectangle, and wherein the corners of said rectangle in each layer of blocks are partially filled in so as to form projections which support a rectangular metal perforated member near the top of each layer of blocks.

7. An outdoor grill which is constructed from blocks without the use of mortar or cement, comprising:
   a. a flat floor section which is formed from a plurality of elongated blocks;
   b. two legs which rest on the flat floor section and are formed by a plurality of blocks laid one on top of another such that said legs are of equal height;
   c. two supporting elongated blocks, one resting on the top of each leg;
   d. a flat base section which is formed from six elongated block which rest on top of the two supporting blocks and which are arranged such that each pair of blocks has is adjacent ends abutting one another to thereby form a rectangular section having a width of three blocks and a length of two blocks, wherein the center pair of blocks has complementary recesses in their adjacent ends, and wherein said flat base section has a channel in its top surfaces;
   e. a flat metal plate positioned in said complementary recesses;
   f. a flue section formed from two layers of block sections, wherein the inner sides of said flue form a rectangle, wherein the corners of the rectangle in each layer of blocks are partially filled in to provide projections, and wherein the lower layer of block sections has an opening therein for providing draft to said flue section;

g. two metal screen members, wherein each screen member rests on the projections in the inside rectangular corners of the flue section such that one screen member rests at the top of the lower layer of block sections so as to support the coal, and the other screen member rests at the top of the upper layer of block sections so as to support the food; and h. a block for closing the opening in the lower layer of block sections forming said flue section.